United States Patent
Mahaffey et al.

(10) Patent No.: US 10,524,328 B1
(45) Date of Patent: Dec. 31, 2019

(54) FIXTURE MOUNT SENSOR WITH REMOTE ENERGY USAGE REPORTING

(71) Applicant: Douglas Lighting Controls, Burnaby (CA)

(72) Inventors: Rob Mahaffey, Burnaby (CA); John Cavacuiti, Burnaby (CA); Travis L. Berry, Madison, AL (US)

(73) Assignee: Douglas Lighting Controls, Burnaby, BC (CA)

( * ) Notice: Subject to any disclaimer, the term of this patent is extended or adjusted under 35 U.S.C. 154(b) by 0 days.

(21) Appl. No.: 16/371,943

(22) Filed: Apr. 1, 2019

Related U.S. Application Data

(60) Provisional application No. 62/650,410, filed on Mar. 30, 2018.

(51) Int. Cl.
*H05B 33/08* (2006.01)
*H05B 37/02* (2006.01)

(52) U.S. Cl.
CPC ....... *H05B 33/089* (2013.01); *H05B 33/0887* (2013.01); *H05B 37/0218* (2013.01); *H05B 37/0227* (2013.01); *H05B 37/0245* (2013.01)

(58) Field of Classification Search
CPC .............. H05B 33/089; H05B 33/0818; H05B 33/0842; H05B 33/0845; H05B 33/0803; H05B 33/0884; H05B 37/02; H05B 37/0227; H05B 37/0245; H05B 37/0272; Y02B 20/345; Y02B 30/347; Y02B 70/3216; F21V 23/045; F21V 23/0442; F21Y 2115/10
See application file for complete search history.

(56) References Cited

U.S. PATENT DOCUMENTS

| 4,268,825 | A  | 5/1981  | Kaplan        |
|-----------|----|---------|---------------|
| 4,963,962 | A  | 10/1990 | Kruegle et al.|
| 5,448,587 | A  | 9/1995  | Huang         |
| 5,489,827 | A  | 2/1996  | Xia           |
| 5,530,322 | A  | 6/1996  | Ference et al.|
| 7,239,280 | B2 | 7/2007  | Kordass et al.|
| 7,264,380 | B1 | 9/2007  | Monroe et al. |
| 7,490,960 | B1 | 2/2009  | Fiorino et al.|

(Continued)

FOREIGN PATENT DOCUMENTS

WO 2017045885 A1 3/2017

*Primary Examiner* — Haissa Philogene
(74) *Attorney, Agent, or Firm* — Patterson Intellectual Property Law, P.C.; Gary L. Montle; Alex H. Huffstutter (57) ABSTRACT

An apparatus, and lighting systems and methods are provided for controlling and reporting power usage of an LED driver having an LED load driven by the LED driver. The apparatus is coupled to at least an auxiliary port of the LED driver for monitoring a dimming control voltage associated with the LED driver. The apparatus is configured to estimate the power usage of the LED driver and the LED load based on programmed relationships between the monitored dimming control voltage and a selected dimming profile associated with the LED driver. The dimming profile may either be a selected generic dimming profile for adequate reporting of the power usage or a selected specific dimming profile for increased accuracy of the power usage estimation. The apparatus is further configured to transmit the estimated power usage to an external device for dashboarding and energy savings purposes.

20 Claims, 5 Drawing Sheets

(56) References Cited

U.S. PATENT DOCUMENTS

| | | | |
|---|---|---|---|
| 7,673,842 B2 | 3/2010 | Nevers et al. | |
| 7,844,367 B2 | 11/2010 | Nickerson et al. | |
| 8,033,686 B2 * | 10/2011 | Recker | H05B 33/0803 |
| | | | 362/249.02 |
| 8,159,156 B2 | 4/2012 | Henig et al. | |
| 8,393,779 B2 | 3/2013 | Myojo | |
| 8,593,079 B2 * | 11/2013 | Sadwick | H05B 33/0815 |
| | | | 315/224 |
| 8,890,418 B2 * | 11/2014 | Mohan | H05B 37/02 |
| | | | 314/64 |
| 9,192,028 B2 | 11/2015 | Walma et al. | |
| 9,521,724 B1 | 12/2016 | Berry et al. | |
| 9,565,744 B2 * | 2/2017 | Lai | H05B 37/0272 |
| 9,629,227 B2 | 4/2017 | Bello et al. | |
| 9,747,196 B2 | 8/2017 | Simonyi et al. | |
| 10,032,364 B2 | 7/2018 | Hamm et al. | |
| 2004/0042779 A1 | 3/2004 | Maeda et al. | |
| 2004/0267385 A1 | 12/2004 | Lingemann | |
| 2005/0258326 A1 | 11/2005 | St-Pierre | |
| 2006/0026954 A1 | 2/2006 | Truong et al. | |
| 2008/0136334 A1 | 6/2008 | Robinson et al. | |
| 2008/0218087 A1 | 9/2008 | Crouse et al. | |
| 2010/0270982 A1 | 10/2010 | Hausman, Jr. et al. | |
| 2010/0280677 A1 | 11/2010 | Budike, Jr. | |
| 2010/0301772 A1 | 12/2010 | Hahnlen et al. | |
| 2011/0133668 A1 | 6/2011 | Rix et al. | |
| 2011/0199004 A1 | 8/2011 | Henig et al. | |
| 2011/0234117 A1 | 9/2011 | Knapp et al. | |
| 2012/0068611 A1 | 3/2012 | Steiner et al. | |
| 2012/0286131 A1 | 11/2012 | Arnold, III | |
| 2013/0076270 A1 | 3/2013 | Alexandrovich et al. | |
| 2013/0201668 A1 | 8/2013 | Chien | |
| 2013/0319752 A1 | 12/2013 | Cowles et al. | |
| 2014/0055014 A1 | 2/2014 | Pan | |
| 2014/0328211 A1 | 11/2014 | Holleis et al. | |
| 2014/0379305 A1 | 12/2014 | Kumar | |
| 2015/0154850 A1 | 6/2015 | Fadell et al. | |
| 2015/0228419 A1 | 8/2015 | Fadell et al. | |
| 2015/0327348 A1 | 11/2015 | Dau | |
| 2016/0127875 A1 | 5/2016 | Zampini, II | |
| 2017/0067659 A1 | 3/2017 | Silver et al. | |
| 2018/0128448 A1 | 5/2018 | Chien | |

* cited by examiner

FIXTURE MOUNT SENSOR WITH REMOTE ENERGY USAGE REPORTING

CROSS-REFERENCES TO RELATED APPLICATIONS

This application claims benefit of the following patent application which is hereby incorporated by reference: U.S. Provisional Application No. 62/650,410 filed Mar. 30, 2018, entitled "In Fixture Mount Sensor with Remote Energy Usage Reporting".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to circuitry and methods for reporting power usage of a light fixture. More particularly, the present invention relates to auxiliary sensors and control methods for controlling a light emitting diode (LED) driver of the light fixture and estimating power usage of the LED driver and an associated LED load.

BACKGROUND

LED lighting has continued to grow in popularity due to its relatively long life, better lumen output per watt than may typically be obtained with traditional lighting, and superior dimming capability. Unfortunately, conventional LED drivers lack any inherent capability for reporting individual driver power consumption information to customers. Such information is, however, very desirable for a customer to have, at least to better manage the overall power consumption in a given facility.

Also, energy code requirements are becoming increasingly strict. Some require increased luminaire control capabilities such as utility driven demand response, daylight harvesting, occupancy sensing, bi-level dimming, and/or on/off control.

Fixture manufacturers are increasingly being required to include sensing capability into their manufactured fixtures for energy savings and code compliance. Unfortunately, it is quite costly to comply with many of these requirements because to do so would require potential redesigning and retooling. Another issue arises when deciding what to do with unsold, noncompliant, inventory.

Energy monitoring enables owners and operators to submit rebate claims to their energy utilities. These potential rebates may for example provide an improved return on investment (ROI) when fitting new fixtures and controls to their buildings.

BRIEF SUMMARY

Accordingly, there is a need for dimming systems and methods for performing power estimation at a low cost in order to be able to feedback the power usage of an LED driver and LED load to the customer for improving power management. The proposed method can effectively achieve that goal without adding any costly dedicated measurement devices for directly measuring power consumption.

The sensor, and system thereof provide in fixture power usage monitoring and/or control that works without a proprietary driver. The sensor is a small form factor sensor that fits into a standard opening in a fixture and connectors to an LED driver housed within the fixture. The sensor uses an algorithm to measure energy usage of the fixture (e.g., the LED driver and the LED load associated with the fixture) by monitoring the 0-10V dimming command and correlating this measurement with the current usage to estimate the power usage. Accordingly, the present disclosure provides easy energy monitoring with generic drivers to thus allow owners/operators more choice in terms of fitting control systems to their buildings. It is simply a more cost-effective retrofit control solution.

In one exemplary embodiment of a lighting system as disclosed herein for controlling and reporting power usage, an LED driver system comprises an LED driver coupled to a voltage source and having at least an input, an output, and an auxiliary port. The input is connected to the voltage source for powering the LED driver, and an LED load is coupled to the output of the LED driver. A power consumption sensor is configured for selective coupling to the auxiliary port of the LED driver, and is further configured to monitor a dimming control voltage associated with the LED driver, and to estimate a power usage of the LED driver and the LED load based on programmed relationships between the dimming control voltage and a selected dimming profile associated with the LED driver. At least one external device is configured to selectively communicate with the power consumption sensor, to control an operational mode of the power consumption sensor, and to receive the estimated power usage of the LED driver and the LED load.

In another exemplary embodiment, the selected dimming profile is one of a specific dimming profile or a generic dimming profile, wherein the specific dimming profile includes specific operational parameters associated with the LED driver, and the generic dimming profile includes generic operational parameters representative of the LED driver.

In another exemplary embodiment, the specific and generic dimming profiles include one of specific load parameters or generic load parameters associated with the LED load connected to the LED driver.

In another exemplary embodiment, the operational mode of the power consumption sensor is one of a programming mode, an active mode, or a passive mode. In both of the active and passive modes, the power consumption sensor is configured to monitor the dimming control voltage and estimate the power usage of the LED driver and the LED load.

In another exemplary embodiment, the active mode is either a manual dimming mode, an automatic daylight sensing mode, or an automatic occupancy mode.

In another exemplary embodiment, in the manual mode the dimming control voltage delivered to the LED driver is adjusted manually using the at least one external device. In the automatic daylight mode, the power consumption sensor monitors an intensity of natural light proximate to the power consumption sensor and automatically adjusts the dimming control voltage based on the sensed intensity of the natural light for reducing power usage. In the automatic occupancy mode the power consumption sensor automatically adjusts the dimming control voltage in response to the power consumption sensor sensing an occupant.

In another exemplary embodiment, the power consumption sensor is configurable to automatically adjust a relationship between the dimming control voltage and a dimming command signal over time in order to offset a degradation of LED load. The dimming command signal is used to set the dimming control voltage.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-5, an exemplary lighting system 100 and associated methods are now illustrated in greater detail. As can best be seen in FIGS. 1-2, the lighting system 100 includes an LED driver 102, an LED load 104, a smart sensor 106, and at least one external device 108. The smart sensor 106 may also be referred to as a power consumption sensor 106 or an apparatus 106 for controlling and reporting power usage of the LED driver 102 and the LED load 104. The at least one external device 108 may also be referred to herein as at least one auxiliary device 108 or at least one handheld (e.g., user) device 108.

Figure 1:
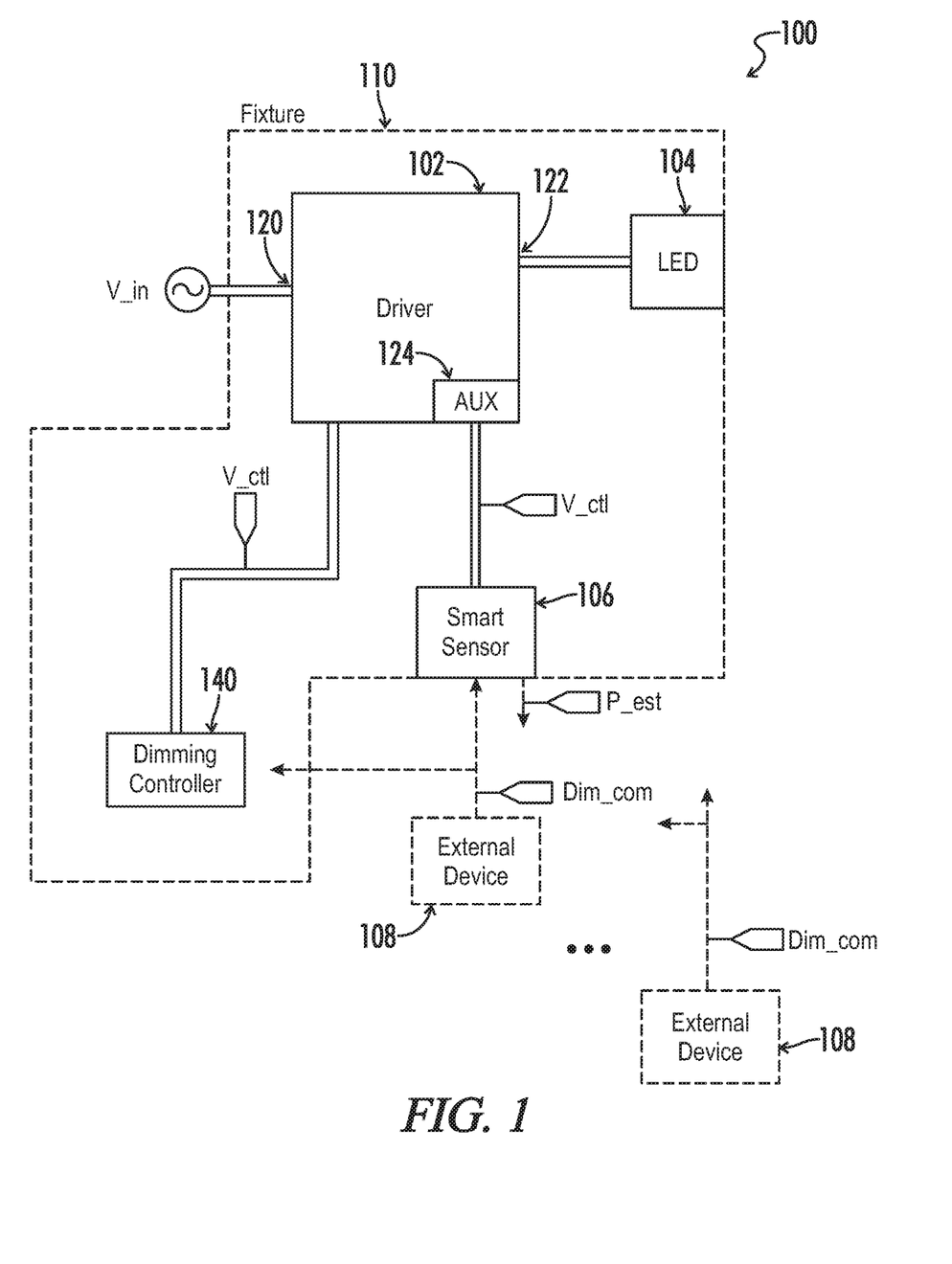
FIG. 1 illustrates a circuit diagram of an embodiment of a lighting system for controlling and reporting power usage in accordance with the present disclosure.
Figure 2:
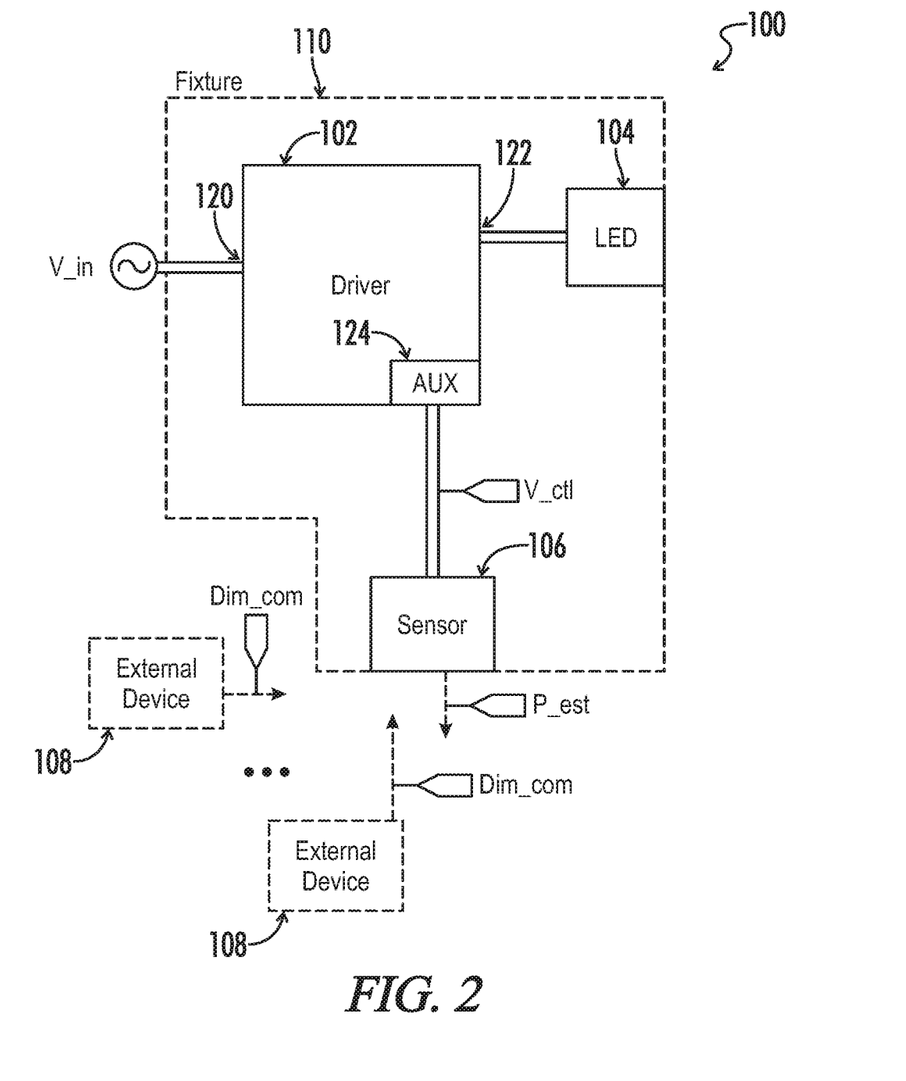
FIG. 2 illustrates a circuit diagram of an alternate embodiment of the lighting system of FIG. 1 further having a dimming controller in accordance with the present disclosure.

The lighting system 100 may further include a fixture 110 (also referred to herein as a light fixture 110). The fixture 110 may be configured to house at least the LED driver 102, the LED load 104, and the smart sensor 106.

The LED driver 102 has at least an input 120, an output 122, and an auxiliary port 124. The input 110 of the LED driver 102 is coupled to a voltage source V_in configured to provide power to the LED driver 102. The LED load 104 is coupled to the output 112 of the LED driver 102 and is configured to receive power from the LED driver 102.

The smart sensor 106 may be configured to fit into a standard opening (not shown) in the fixture 110. The smart sensor 106 is configured to couple to the auxiliary port 124 of the LED driver 102. The smart sensor 106 is configurable to monitor a dimming control voltage V_ctl associated with the LED driver 102. The dimming control voltage V_ctl may typically range from 0-10 volts, however, this range may be different in other embodiments. The smart sensor 106 is further configurable to estimate a power usage P_est of the LED driver 102 and the LED load 104 based on programmed relationships between the dimming control voltage V_ctl and a selected dimming profile 126 associated with the LED driver 102.

The smart sensor 106 is configurable to operate according to a selected operational mode 130. The at least one external device 108 may be configured to selectively communicate with the smart sensor 106, to control the selected operational mode 130, and to receive the estimated power usage P_est of the LED driver 102 and the LED load 104. The selected operational mode 130 may be one of a programming mode 132, an active mode 134, or a passive mode 136. In both the active mode 134 and the passive mode 136, the smart sensor 106 is configured to implement algorithms to estimate the power usage P_est of the LED driver 102 and the LED load 104 based upon the programmed relationships between the dimming control voltage V_ctl and the selected dimming profile 126 associated with the LED driver 102. During the programming mode 132 the at least one external device 108 is used to select the appropriate dimming profile 126 for the LED driver 102 to which the smart sensor 106 is connected. In the active mode 134, the smart sensor 106 may be configured to automatically adjust a relationship between the dimming control voltage V_ctl and the dimming command signal Dim_com over time (e.g., a rated life of the LED load 104) in order to offset a degradation of the LED load 104.

The selected dimming profile 126 may be one of a specific dimming profile 126_S or a generic dimming profile 126_G. The specific dimming profile 126_S may include specific operational parameters associated with the LED driver 102. The generic dimming profile 126_G may include generic operational parameters that are representative of the LED driver 102 (e.g., options such as 30 W, 50 W, etc.). The specific dimming profile 126_S is used for increased accuracy while the generic dimming profile 126_G provides adequate power usage P_est estimation of the LED driver 102 and LED load 104. Both the specific and generic dimming profiles 126_S, 126_G may include one of specific load parameters or generic load parameters, respectively, associated with the LED load 104 connected to the LED driver 102.

In certain embodiments (not shown), the specific dimming profile 126_S of the LED driver 102 may be selected with generic load parameters or the generic dimming profile 126_G of the LED driver 102 may be selected with specific load parameters.

Figure 4:
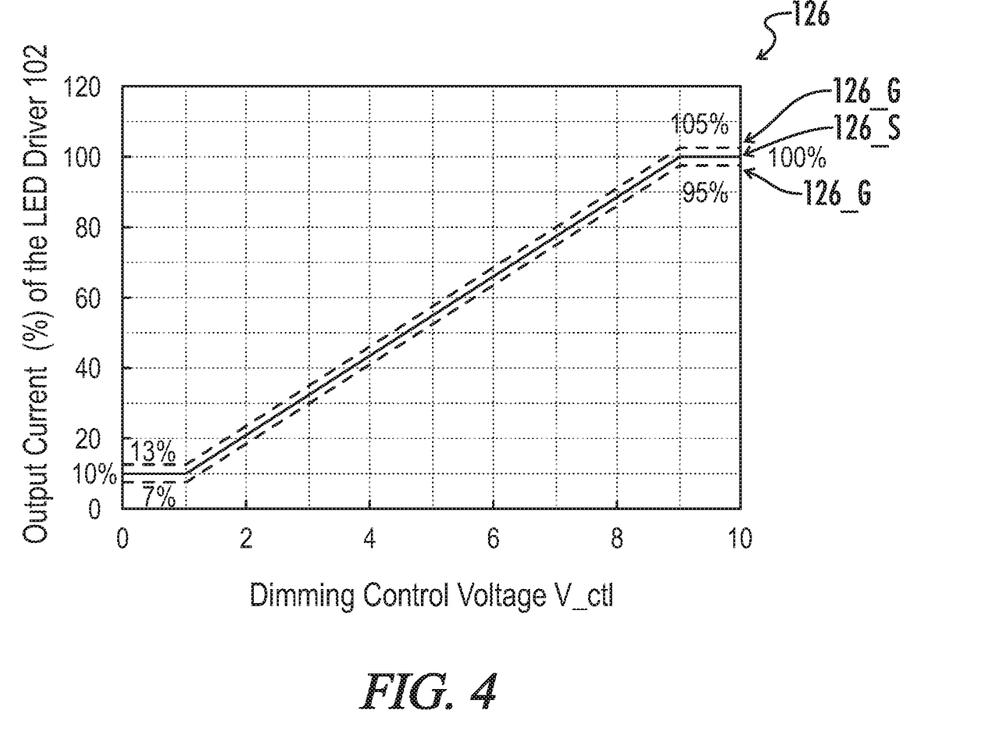
FIG. 4 illustrates a graphical dimming profile relationship between a dimming control voltage and an output current of an LED driver of the lighting system of FIG. 1 in accordance with the present disclosure.

As can best be seen in FIG. 4, an exemplary embodiment of a dimming profile 126. The specific dimming profile 126_S is shown nested within the generic dimming profile 126_G because the specific dimming profile 126_S is a more accurate representation of how the LED driver 102 and LED load 104 are expected to perform. The generic dimming profile 126_G as shown in FIG. 4 is intended to illustrate that the generic dimming profile 126_G when utilized may only provide an adequate estimation of a correlation between a range of dimming control voltages V_ctl and an output current percentage representative of the LED driver 102.

The dimming control voltage is shown along the x-axis and the output current percentage representative of the Led driver 102 is shown along the y-axis. Although illustrated as a percentage, the y-axis may implement actual current approximations associated with the LED driver 102 at a particular dimming control voltage V_ctl when the dimming profile 126 associated with the actual LED driver 102 utilized is selected.

As can best be seen in FIG. 1, the lighting system 100 includes a dimming controller 140. The dimming controller may be required for the smart sensor 106 to operate in the passive mode 136 because the smart sensor 106 only monitors the dimming control voltage V_ctl associated with the LED driver 102 and estimates the power usage P_est of the LED driver 102 and LED load 104 in the passive mode 136. The dimming controller 140 may be configured in electrical communication with the LED driver 102 so that the dimming controller may adjust the dimming control voltage V_ctl. The dimming controller 140 may receive a dimming command signal Dim_com from the at least one external device 108. The dimming controller 140 accordingly uses the dimming command signal Dim_com to set the dimming control voltage V_ctl. The dimming controller 140 may receive the dimming command signal Dim_com either through wired or wireless communications.

As can best be seen in FIG. 2, the dimming controller 140 is removed from the lighting system 100. Accordingly, the smart sensor 106 may operate in only the active mode 134. The smart sensor 106 when operating in the active mode 134 both controls and monitors the dimming control voltage V_ctl. Referring back to FIG. 1, it should be noted that the smart sensor 106 may operate in either the active mode 134 or the passive mode 136 when the dimming controller 140 is present. When the smart sensor 106 of the lighting system 100 as shown in FIG. 1 operates in the active mode 134, the smart sensor 106 bypasses the dimming controller 140.

Figure 3:
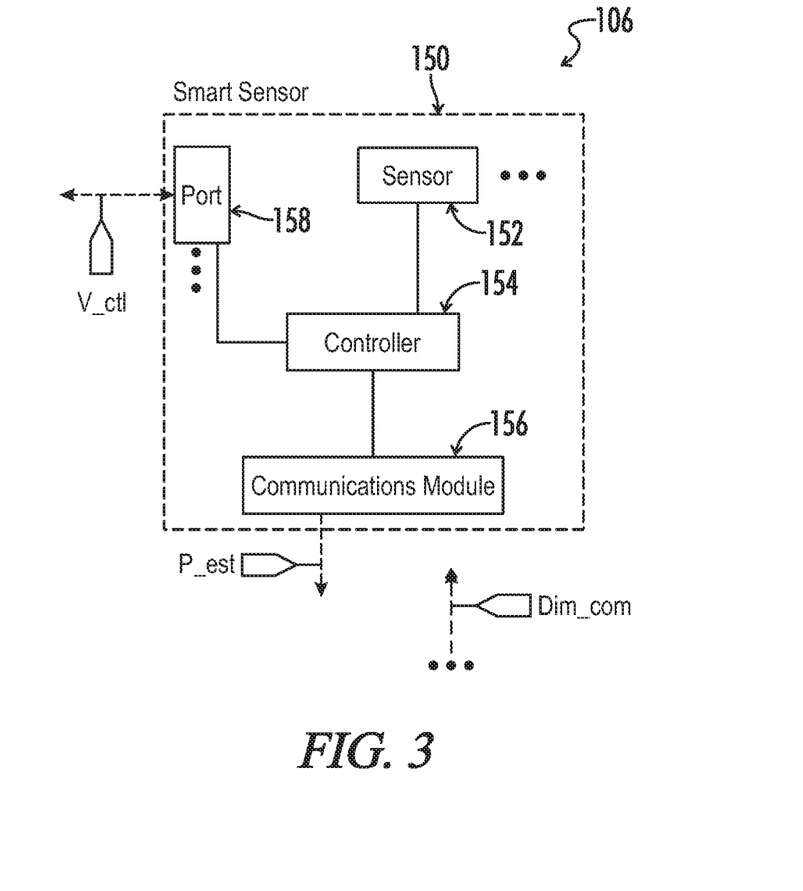
FIG. 3 illustrates a circuit diagram of a smart sensor of the lighting system of FIG. 1 in accordance with the present disclosure.

As can best be seen in FIG. 3, the smart sensor 106 may include a smart sensor housing 150, at least one sensor 152, a controller 154, and a communications module 156. The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The smart sensor housing 150 is configured to be connected to the fixture 110 (e.g., an opening in the fixture 110 that houses the LED driver 102 and the LED load 104). The at least one sensor 152 may be coupled an opening in the smart sensor housing 150. The controller 154 and communications module 156 may be housed within the smart sensor housing 150.

The at least one sensor 152 may be for sensing one or more external stimuli associated with a location of the fixture 110. The at least one sensor 152 may be configured to sense ambient light (e.g., sunlight) proximate to the sensor or movement (e.g., a person's presence) proximate to the sensor which is associated with the location where the fixture 110 and the smart sensor 106 are located. Alternatively, the at least one sensor 152 may be configured to sense (or measure) the dimming control voltage V_ctl associated with the LED driver 102.

All embodiments of the current disclosure may be used with any appropriate sensor 152 including, in non-limiting embodiments, active infrared (AIR) sensors, passive infrared (PIR) sensors, microwave (MW) sensors, area reflective type sensors, ultrasonic sensors, vibration sensors, video motion sensors, tomographic motion sensors, any combination thereof, and the like.

The controller 154 may be configured to manipulate the dimming control voltage V_ctl associated with the LED driver 102 and also to estimate the power usage P_est of the LED driver 102 and the LED load 104.

The communications module 156 may be for transmitting the estimated power usage P_est of the LED driver 102 and LED load 104 to the at least one external device 108. The communication module 156 may be configured to communicate with the at least one external device 108 and/or a central server (not shown) using any communication standard (e.g., wired, wireless, client-server, peer-to-peer, etc.). In one exemplary embodiment, the communication module 156 is a wireless signal module (e.g., a Bluetooth or Wi-Fi communication element). The communications module may communicate with the at least one external device, using, for example, Bluetooth, to transmit (or report) power usage P_est by the LED driver 102 and the LED load 104 to the at least one external device 108.

The smart sensor 106 at least one port 158 configured to be connected to at least the auxiliary port 124 of the LED driver 102. In one embodiment, the at least one port 158 may be configured to receive power and sense the dimming control voltage V_ctl. In other embodiments (not shown), the at least one port 158 includes two ports, a first port for receiving power from the auxiliary port 124 of the LED driver 102 and a second port for at least monitoring or sensing the dimming control voltage V_ctl associated with the LED driver 102. In certain embodiments (e.g., when the active mode 134 is possible), the second port may also be configured to control the dimming control voltage V_ctl.

The at least one external device 108 may include an application (not shown) interface for deciphering the commutated information from the communications module 156 of the smart sensor 106. The application may enable a user to easily program the smart sensor 106 (e.g., select an operational mode 130 and a dimming profile 126) and view the power usage P_est estimated by the smart sensor 106. Further, the application may allow for energy reporting to be easily pulled from the smart sensor 106.

Figure 5:
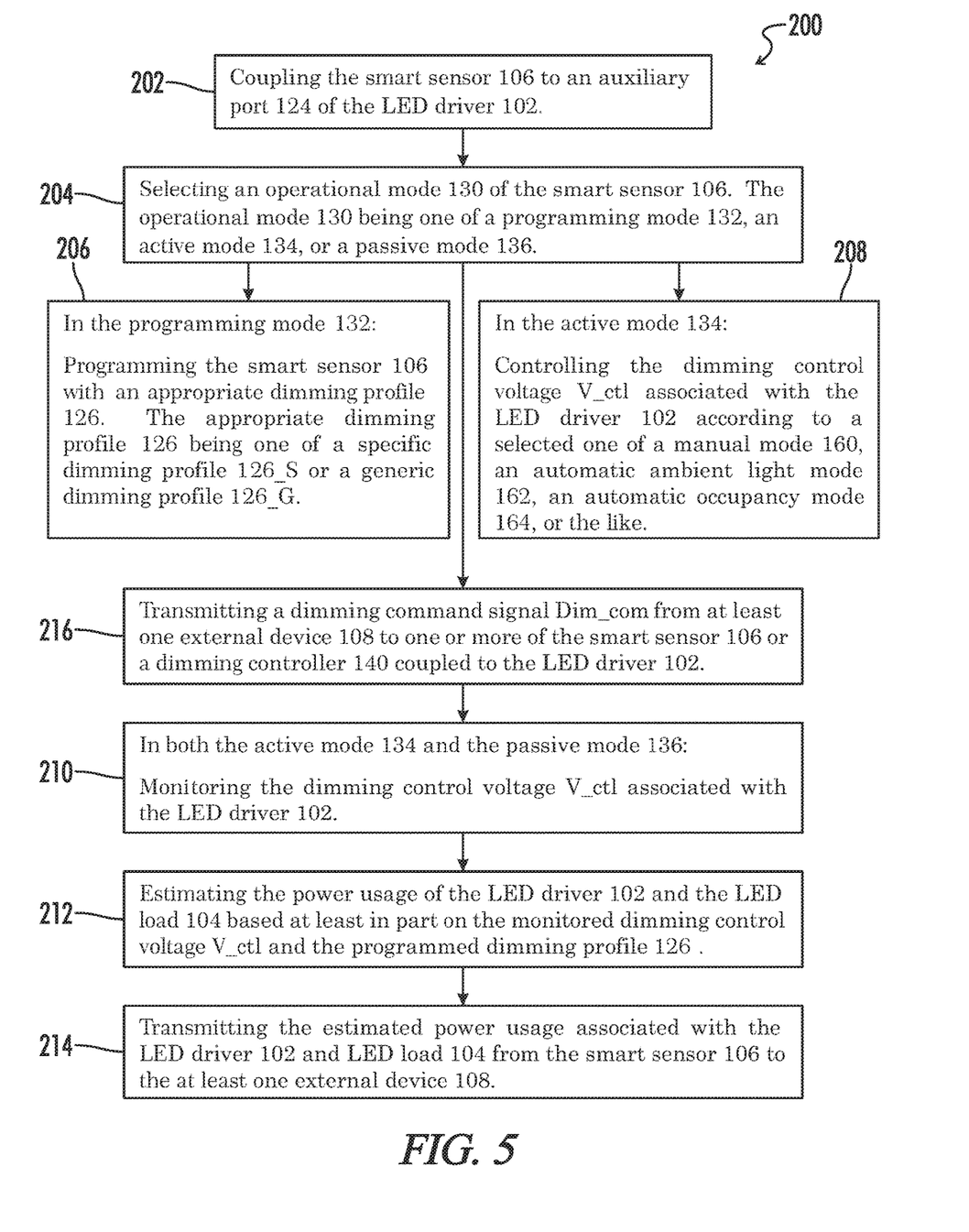
FIG. 5 illustrates a flowchart representing an exemplary method controlling and estimating power usage an LED driver and an LED load of the lighting system of FIG. 1 in accordance with the present disclosure.

Referring to FIG. 5, a method 200 for controlling and reporting power usage P_est of the LED driver 102 and the LED load 104 driven thereby is provided. The method 200 may include coupling 202 the smart sensor 106 to the LED driver (e.g., at least the auxiliary port 124 of the LED driver 102). The auxiliary port 124 of the LED driver 102 may provide power to the smart sensor 106 and may also provide information to the smart sensor 106 regarding the dimming control voltage V_ctl associated with the Led driver 102. In certain embodiments (not shown), the auxiliary port 124 of the LED driver 102 may only provide power to the smart sensor 106. In such embodiments, the smart sensor 106 may need to additionally be connected to a dimming control interface (not shown) of the LED driver 102 for measuring and/or controlling the dimming control voltage V_ctl associated with the LED driver 102.

The method 200 may further include selecting 204 the operational mode 130 of the smart sensor 106. The operational mode 130 may be one of the programming mode 132, the active mode 134, or the passive mode 136.

In the programming mode 132, the method 200 may include programming 206 the smart sensor 106 (e.g., the controller 154 of the smart sensor 106) with the appropriate dimming profile 126 associated with the LED driver. The step of programming 206 may be performed using the at least one external device 108. The step of programming 206 the smart sensor 106 with the appropriated dimming profile 126 may include selecting one of a specific dimming profile 126_S or a generic dimming profile 126_G associated with the LED driver 102 and/or LED load 104 using the at least one external device 108.

In the active mode 134, the method 200 may include controlling 208 the dimming control voltage V_ctl according to a selected one of a manual mode 160, an automatic ambient light mode 162, an automatic occupancy mode 164, a combination thereof, or some other active mode in accordance with the present disclosure. The automatic ambient light mode 162 may also be referred to herein as an automatic daylight sensing mode 162. The step of controlling 208 the dimming control voltage V_ctl may be performed by the smart sensor 106 based upon received dimming command signals Dim_com.

In the manual mode 160, the dimming control voltage V_ctl associated with the LED driver 102 may be controlled by the smart sensor 106 based on the received dimming command signals Dim_com from the at least one external device 108. In the manual mode 160, the smart sensor may be able to dim the LED load 104 and turn it on and off based on the received dimming command signal Dim_com.

In the automatic ambient light mode 162, the at least one sensor 152 monitors or senses an intensity of natural ambient light in the vicinity of the smart sensor 106 and automatically adjusts the dimming control voltage V_ctl associated with the Led driver 102 based on the sensed intensity of the natural ambient light. The automatic ambient light mode 162 may be implemented to save power by dimming the LED load 104 in order to merely supplement the natural ambient light.

In the automatic occupancy mode 164, the at least one sensor 152 monitors or senses whether an occupant is present in the vicinity of the smart sensor 106 and automatically adjusts the dimming control voltage V_ctl associated with the Led driver 102 in response to the sensed occupant.

The method 200 may further include, in both the active mode 134 and the passive mode 136, monitoring 210 a dimming control voltage V_ctl associated with the LED driver 102. In the passive mode 136, the smart sensor 106 does not control the dimming control voltage V_ctl associated with the LED driver 102.

The method 200 may still further include, in both the active mode 134 and the passive mode 136, estimating 212 the power usage P_est of the LED driver 102 and the LED load 104 based at least in part on the monitored dimming control voltage V_ctl and the programmed dimming profile 126.

The method 200 may further include, in both the active mode 134 and the passive mode 136, transmitting 214 the estimated power usage P_est associated with the LED driver 102 from the smart sensor 106 to the at least one external device 108. The estimated power usage P_est may be transmitted to the at least one external device 108 in response to a request from the at least one external device.

The method 200 may further include transmitting 216 the dimming command signal Dim_com from the at least one external device 108 to one or more of the smart sensor 106 or the dimming controller 140 when present.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration.

The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting system for controlling and reporting power usage, the lighting system comprising:
   an LED driver coupled to a voltage source, the LED driver having at least an input, an output, and an auxiliary port, the input connected to the voltage source for powering the LED driver;
   an LED load coupled to the output of the LED driver;
   a power consumption sensor configured for selective coupling to the auxiliary port of the LED driver, the power consumption sensor further configured to monitor a dimming control voltage associated with the LED driver, and to estimate a power usage of the LED driver and the LED load based on programmed relationships between the dimming control voltage and a selected dimming profile associated with the LED driver; and
   at least one external device configured to selectively communicate with the power consumption sensor, to control an operational mode of the power consumption sensor, and to receive the estimated power usage of the LED driver and the LED load.

2. The lighting system of claim 1, wherein:
   the selected dimming profile is one of a specific dimming profile or a generic dimming profile;
   the specific dimming profile includes specific operational parameters associated with the LED driver; and the generic dimming profile includes generic operational parameters representative of the LED driver.

3. The lighting system of claim 2, wherein:
the specific and generic dimming profiles include one of specific load parameters or generic load parameters associated with the LED load connected to the LED driver.

4. The lighting system of claim 1, wherein:
the operational mode of the power consumption sensor being one of a programming mode, an active mode, or a passive mode; and
in both the active and passive modes the power consumption sensor is configured to monitor the dimming control voltage and estimate the power usage of the LED driver and the LED load.

5. The light system of claim 4, wherein:
the active mode is a selected one of a manual dimming mode, an automatic daylight sensing mode, or an automatic occupancy mode.

6. The lighting system of claim 5, wherein:
in the manual mode the dimming control voltage delivered to the LED driver is adjusted manually using the at least one external device;
in the automatic daylight mode the power consumption sensor monitors an intensity of natural light proximate to the power consumption sensor and automatically adjusts the dimming control voltage based on the sensed intensity of the natural light for reducing power usage; and
in the automatic occupancy mode the power consumption sensor automatically adjusts the dimming control voltage in response to the power consumption sensor sensing an occupant.

7. The lighting system of claim 1, wherein:
the power consumption sensor is configurable to automatically adjust a relationship between the dimming control voltage and a dimming command signal over time in order to offset a degradation of LED load; and
the dimming command signal is used to set the dimming control voltage.

8. An apparatus for controlling and reporting power usage of an LED driver and an LED load driven by the LED driver, the apparatus comprising:
a smart sensor housing configured to be connected to a fixture that houses the LED driver and the LED load;
at least one sensing means for sensing one or more external characteristics with a location of the fixture, the at least one sensing means coupled to the smart sensor housing;
a control means for manipulating a dimming control voltage transmitted to the LED driver and for estimating a power usage of the LED driver and the LED load based at least in part on the dimming control voltage and a programmed dimming profile, the control means positioned within the smart sensor housing; and
a communication means for transmitting the estimated power usage of the LED driver and the LED load to an external device, the communications means positioned within the smart sensor housing.

9. A method for controlling and reporting power usage of a light emitting diode (LED) driver and an LED load driven thereby, the method comprising:
programming a power consumption sensor with a dimming profile associated with the LED driver using an auxiliary device;
monitoring a dimming control voltage associated with the LED driver during operation of the LED driver; and
transmitting an estimated power usage associated with the LED driver from the power consumption sensor to the auxiliary device, the power usage based at least in part on the monitored dimming control voltage and the programmed dimming profile.

10. The method of claim 9, further comprising:
connecting the power consumption sensor to an auxiliary port of the LED driver to provide power to the power consumption sensor, wherein the auxiliary port includes information regarding the dimming control voltage associated with the LED driver.

11. The method of claim 9, wherein:
the estimated power usage is transmitted on demand in response to a request from the auxiliary device.

12. The method of claim 9, further comprising:
selecting one of a specific dimming profile or a generic dimming profile, the specific dimming profile includes specific operational parameters associated with the LED driver, the generic dimming profile includes generic operational parameters representative of the LED driver.

13. The method of claim 9, further comprising:
transmitting a dimming command signal from the auxiliary device to the power consumption sensor for controlling the dimming control voltage associated with the LED driver.

14. The method of claim 9, further comprising:
selecting an operational mode of the power consumption sensor using the auxiliary device, the operational mode being one of a programming mode, an active mode, or a passive mode, wherein:
the step of programming the power consumption sensor is performed in the programming mode;
the power consumption sensor controls the dimming control voltage in the active mode; and
the steps of monitoring the dimming control voltage and transmitting the estimated power usage associated with the LED driver are performed in the active mode and in the passive mode.

15. The method of claim 14, further comprising in the active mode:
selecting one of a manual dimming mode, an automatic daylight sensing mode, or an automatic occupancy mode.

16. The method of claim 15, further comprising in the manual dimming mode:
controlling the dimming control voltage using the auxiliary device.

17. The method of claim 15, further comprising in the automatic daylight sensing mode:
sensing an ambient light intensity using the power consumption sensor; and
automatically adjusting the dimming control voltage associated with the LED driver based on the sensed ambient light intensity.

18. The method of claim 15, further comprising in the automatic occupancy mode:
sensing an occupant using the power consumption sensor; and
automatically adjusting the dimming control voltage associated with the LED driver based on whether the occupant was sensed.

19. The method of claim 9, further comprising:
automatically adjusting the dimming control voltage using the power consumption sensor to offset a degradation of the LED load over a useful life of the LED load.

20. The method of claim 9, further comprising:
providing power to the power consumption sensor from an auxiliary port of the LED driver.

* * * * *